US010410278B2

(12) United States Patent
Altermatt et al.

(10) Patent No.: US 10,410,278 B2
(45) Date of Patent: Sep. 10, 2019

(54) METHOD AND APPARATUS FOR INTEGRATED IMAGE CAPTURE FOR VEHICLES TO TRACK DAMAGE

(71) Applicant: The Crawford Group, Inc., St. Louis, MO (US)

(72) Inventors: John Allan Altermatt, Wildwood, MO (US); Kelli Jane Boruff, St. Charles, MO (US); Matthew Lynn Crawford, O'Fallon, MO (US); Robert Noah Matroni, St. Peters, MO (US)

(73) Assignee: The Crawford Group, Inc., St. Louis, MO (US)

( * ) Notice: Subject to any disclaimer, the term of this patent is extended or adjusted under 35 U.S.C. 154(b) by 917 days.

(21) Appl. No.: 14/340,217

(22) Filed: Jul. 24, 2014

(65) Prior Publication Data

US 2015/0032580 A1 Jan. 29, 2015

Related U.S. Application Data

(60) Provisional application No. 61/858,315, filed on Jul. 25, 2013.

(51) Int. Cl.
*G06Q 30/06* (2012.01)
*H04N 7/18* (2006.01)
*G06Q 10/08* (2012.01)

(52) U.S. Cl.
CPC ....... *G06Q 30/0645* (2013.01); *G06Q 10/087* (2013.01); *H04N 7/181* (2013.01)

(58) Field of Classification Search
CPC ... G06Q 10/087; G06Q 30/0645; H04N 7/187
USPC ....... 705/13, 28, 22, 39, 26.3, 307; 382/209, 382/141, 218, 278; 348/722, E5.024
See application file for complete search history.

(56) References Cited

U.S. PATENT DOCUMENTS 5,710,557 A 1/1998 Schuette
6,630,893 B2 10/2003 Schuette
(Continued)

OTHER PUBLICATIONS

"Rental Pics", Rental Pics—Android Apps on Google Play, retrieved from the Internet on Dec. 12, 2013, https://play.google.com/store/apps/details?id=com.dmwtec.picreport, 2 pages.
(Continued)

*Primary Examiner* — Vanel Frenel
(74) *Attorney, Agent, or Firm* — Thompson Coburn LLP

(57) ABSTRACT

Methods, apparatuses, and computer program products are disclosed for building a consolidated searchable database of vehicle images that were captured at a plurality of different sites. The database can be searched to track vehicle condition over time and over a plurality of transactions involving the vehicles. From this information, a determination can be made as to whether damage first arose on a vehicle during a particular transaction for the purpose of allocating responsibility for payment of repair costs.

9 Claims, 12 Drawing Sheets

(56) References Cited

U.S. PATENT DOCUMENTS

| | | | | |
|---|---|---|---|---|
| 6,952,558 | B2* | 10/2005 | Hardacker | H04L 67/26 340/6.1 |
| 7,342,511 | B2 | 3/2008 | Schuette | |
| 7,889,931 | B2* | 2/2011 | Webb | G01N 21/8806 382/141 |
| 8,230,362 | B2 | 7/2012 | Couch | |
| 8,831,970 | B2* | 9/2014 | Weik, III | G06Q 10/00 705/13 |
| 2008/0183535 | A1* | 7/2008 | Kahana | G06Q 30/06 705/37 |
| 2010/0082246 | A1* | 4/2010 | Crane | G01C 21/3476 701/533 |
| 2010/0130223 | A1* | 5/2010 | Liao | H04B 7/0617 455/453 |
| 2011/0040692 | A1* | 2/2011 | Ahroon | G06Q 30/0645 705/307 |
| 2012/0105197 | A1* | 5/2012 | Kobres | G06Q 10/02 340/5.72 |
| 2013/0117078 | A1* | 5/2013 | Weik, III | G06Q 10/00 705/13 |
| 2014/0129113 | A1* | 5/2014 | Van Wiemeersch | F02D 28/00 701/102 |
| 2014/0129301 | A1* | 5/2014 | Van Wiemeersch | G07B 15/02 705/13 |

OTHER PUBLICATIONS

"United States Patent Office Grants Computerized Valet Parking Systems, Inc. (CVPS) a Broadening of Original Patent for Digital Camera Valet Lane Applications", Computerized Valet Parking Systems, Inc.—Press Release, 2008, 2 pages.

Elliott, "'Before' and 'After' Pictures of Your Rental Car? Now That's Customer CRVIS", Elliott.org, Oct. 6, 2011, retrieved from the Internet on Dec. 12, 2013, http://elliott.org/blog/before-and-after-pictures-of-your-rental-car-now-thats-customer-crvis, 11 pages.

Elliott, "Can Technology Help You Turn the Tables on Your Car Rental Company? (POLL)", HuffPost Travel, Aug. 24, 2013, retrieved from the Internet on Dec. 12, 2013, http://www.huffingtonpost.com/christopher-elliott/can-technology-help-you-t_b_3810037.html, 3 pages.

Elliott, "What Will Your Next Rental Car Know About You? Everything", Elliot.org, Aug. 14, 2013, retrieved from the Internet on Dec. 12, 2013, http://elliott.org/blog/what-will-your-next-rental-car-know-about-you-everything, 10 pages.

Office Action for CA Application 2857860 dated Oct. 5, 2018.

* cited by examiner

| Image (302) | Date (304) | Time (306) | Location (308) | Vehicle ID (310) |
|---|---|---|---|---|
| Image1.jpg | July 10, 2013 | 09:00 am | STL1 | 123xyz |
| Image2.jpg | July 10, 2013 | 09:02 am | STL1 | 234abc |
| ⋮ | ⋮ | ⋮ | ⋮ | ⋮ |
| ImageN.jpg | July 10, 2013 | 08:45 am | CHI2 | 321def |
| ⋮ | ⋮ | ⋮ | ⋮ | ⋮ |
| ImageZ.jpg | July 11, 2013 | 12:43 pm | LAX | 654321 |

Figure 3(a)

| Image (302) | Date (304) | Time (306) | Location (308) | Vehicle ID (310) | Arrival/Departure Flag (312) |
|---|---|---|---|---|---|
| Image1.jpg | July 10, 2013 | 09:00 am | STL1 | 123xyz | Arrival |
| Image2.jpg | July 10, 2013 | 09:02 am | STL1 | 234abc | Departure |
| ⋮ | ⋮ | ⋮ | ⋮ | ⋮ | ⋮ |
| ImageN.jpg | July 10, 2013 | 08:45 am | CHI2 | 321def | Arrival |
| ⋮ | ⋮ | ⋮ | ⋮ | ⋮ | ⋮ |
| ImageZ.jpg | July 11, 2013 | 12:43 pm | LAX | 654321 | Departure |

Figure 3(b)

| Image (302) | Date (304) | Time (306) | Location (308) | Vehicle ID (310) | A/D Flag (312) | Rental Agreement ID (314) |
|---|---|---|---|---|---|---|
| Image1.jpg | July 10, 2013 | 09:00 am | STL1 | 123xyz | A | 987654321 |
| Image2.jpg | July 10, 2013 | 09:02 am | STL1 | 234abc | D | 876543219 |
| ⋮ | ⋮ | ⋮ | ⋮ | ⋮ | ⋮ | ⋮ |
| ImageN.jpg | July 10, 2013 | 08:45 am | CHI2 | 321def | A | 345678912 |
| ⋮ | ⋮ | ⋮ | ⋮ | ⋮ | ⋮ | ⋮ |
| ImageZ.jpg | July 11, 2013 | 12:43 pm | LAX | 654321 | D | 765432198 |

Figure 3(c)

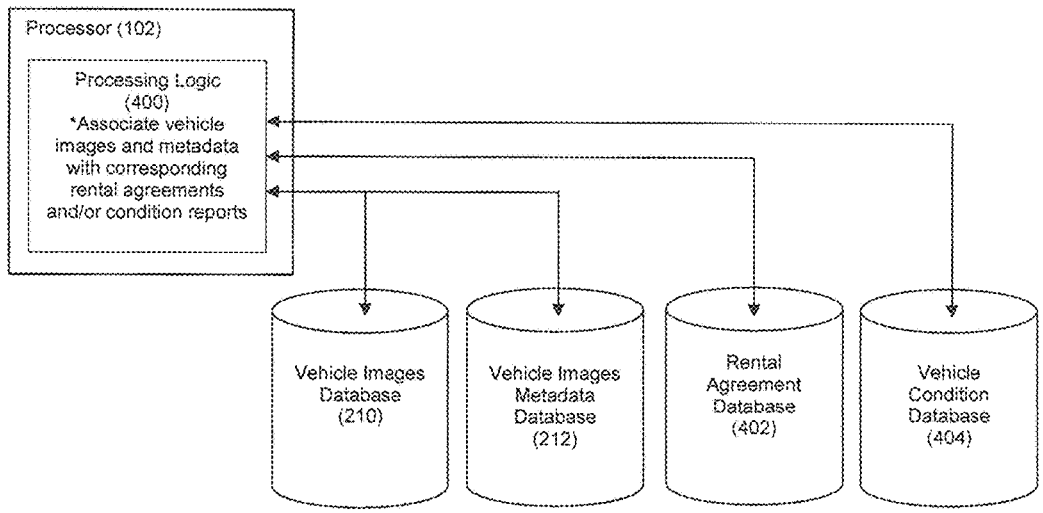

Figure 4

| Condition Report ID (502) | Vehicle ID (504) | Date (506) | Time (508) | Damage Item (510) | Damage Description (512) |
|---|---|---|---|---|---|
| ConditionReport1 | 123xyz | July 10, 2013 | 09:03 am | Driver Side Front Fender | Medium Dent |
| ConditionReport2 | 234abc | July 10, 2013 | 9:01 am | Rear Bumper | Large Scratch |

Figure 5(a)

| Condition Report ID (502) | Vehicle ID (504) | Date (506) | Time (508) | Damage Item (510) | Damage Description (512) | Associated Images(s) (520) |
|---|---|---|---|---|---|---|
| ConditionReport1 | 123xyz | July 10, 2013 | 09:03 am | Driver Side Front Fender | Medium Dent | Image1.jpg ... |
| ConditionReport2 | 234abc | July 10, 2013 | 9:01 am | Rear Bumper | Large Scratch | Image5.jpg ... |

Login

User Name
Password

[Login]

Search

Enter Station & Brand

Station: STL

☑ Enterprise ☐ Alamo ☑ National

Enter Date & Time

Start: 01JAN13    12:00 PM
End:   05MAY13    12:00 PM

Vehicle Information

Search Criteria
License Plate
Unit #
VIN #
RA #

[Search]

Results

| Station | Brand | LP # | Unit # | VIN # | RA # | Date | |
|---------|-------|------|--------|-------|------|------|---|
| STLT01 | National | WXYTWS | 123456 | 12345678 | 123456789 | 3/17/2013 | Details |
| STLT61 | Enterprise | WXYTWS | 123456 | 12345678 | 234567891 | 3/30/2013 | Details |
| STLT61 | Enterprise | WXYTWS | 123456 | 12345678 | 345678912 | 4/7/2013 | Details |

METHOD AND APPARATUS FOR INTEGRATED IMAGE CAPTURE FOR VEHICLES TO TRACK DAMAGE

CROSS REFERENCE AND PRIORITY CLAIM TO RELATED APPLICATION

This application claims the benefit of provisional patent application Ser. No. 61/858,315 entitled "Method and Apparatus for Integrated Image Capture for Vehicles to Track Damage", filed on Jul. 25, 2013, the entire disclosure of which is incorporated herein by reference.

INTRODUCTION

Throughout their operational lives, vehicles are typically operated by different drivers at different times and may become damaged during such use. This is especially the case for rental vehicles because rental vehicles are typically involved in high volumes of different rental transactions where different renters will be the drivers on a weekly or even daily basis. Moreover, it is not unusual for a rental vehicle to become damaged during the course of a rental transaction, for example due to accidents, collisions, and the like. Given this backdrop, a technical challenge faced by people and companies such as rental car companies is tracking when damage to a vehicle occurs, and if such damage occurs while a vehicle is in the custody of a particular driver, being able to determine such a fact and allocate repair costs to the driver accordingly.

It is known in the art to mark damage locations on rental vehicles on paper forms at the start of each rental transaction while customers and rental car company personnel walk around the rental vehicles to inspect for damage. However, this process leads to longer pickup times for customers and creates a mass of paperwork for the rental car company. Furthermore, each paper form's damage notations are subject to potential human error and subjectivity, for example missing damage that may be present or inaccurately recording the nature of such damage.

While systems are known in the art for using cameras to capture images of rental vehicles before and after each rental transaction at different rental facilities to remove the subjectivity of the paper forms, the inventors believe that such systems still do not adequately provide a rental car company, particularly a rental car company with a large number of different rental sites, with an ability to efficiently and/or centrally investigate the cause of damage to rental vehicles. For example, with such systems, it is believed that rental vehicle images are simply filed away in computer storage with minimal indexing, typically only at local rental facilities. Such local storage with minimal indexing presents a significant technical challenge to a rental car company that wishes to effectively track vehicle damage in a standardized and centralized manner. This challenge can be further magnified if the rental car company provides one-way rental services (i.e., rental transactions where the pickup location is different than the drop-off location) to customers.

In an effort to address these needs in the art, the inventors disclose a method comprising (1) receiving, from a plurality of sites, a plurality of vehicle images and metadata for the vehicle images, each vehicle image comprising an image of a vehicle that is indicative of whether body damage is present on that vehicle, the metadata comprising an identifier for each vehicle depicted in the vehicle images and a temporal identifier indicative of when each vehicle image was created, and (2) creating a searchable multi-site database of the received vehicle images indexed by the received metadata, and wherein the receiving and creating steps are performed by a processor. The inventors also disclose corresponding processors and computer program products that are configured to perform such a method.

These inventive embodiments effect significant improvements in the technical field of tracking vehicle damage over time through automated mechanisms. The technical solutions described herein are particularly useful with respect to vehicles that are expected to travel between multiple sites where different drivers are expected to operate the vehicles over the course of such travels. For example, in a disclosed embodiment, the vehicle images can be rental vehicle images, and the sites can be rental sites. As noted above, there has been a long-felt need in the art for improvements with respect to how technology can be harnessed to track damage to rental vehicles over time, and the methods disclosed herein describe specific technical solutions for this long-felt need.

Furthermore, these inventive embodiments provide significant improvements to the functioning of any computer systems that implement the solutions described herein in a number of different ways. For example, with respect to inventive embodiments disclosed herein where a searchable multi-site database of vehicle images is created, and where this database indexes the vehicles images by vehicle image metadata, the need to separately search a number of different computer systems for potentially relevant vehicle images is avoided. This means that any searching for relevant vehicle images can be performed faster and more efficiently than conventional computer solutions where rental vehicle images are stored locally at a number of different rental sites.

With respect to additional inventive embodiments disclosed herein, a processor can automatically associate the rental vehicle images with rental agreements or condition reports corresponding to the rental vehicles depicted in the rental vehicle images. These associations can be stored in a database to further enhance how a computer system is harnessed to track vehicle condition over time.

For example, the inventors disclose a method comprising (1) receiving a plurality of rental vehicle images from a plurality of rental sites, (2) receiving metadata associated with the received rental vehicle images, and (3) for at least a plurality of the received rental vehicle images, (i) processing their associated metadata, (ii) automatically creating a data association in a memory between at least a plurality of those rental vehicle images with at least one of a condition report and a rental agreement for the rental vehicles depicted by those rental vehicle images, and wherein the method steps are performed by a processor. In example embodiments, the rental vehicle images may depict a plurality of rental vehicles with respect to at least one member of the group consisting of (1) at a start of a rental transaction, (2) at an end of a rental transaction, (3) arriving at a rental site, and (4) departing from a rental site. As another example, the inventors disclose a method comprising (1) receiving, from a plurality of rental sites, a plurality of rental vehicle images and metadata for the rental vehicle images, each rental vehicle image comprising an image of a rental vehicle that is indicative of whether body damage is present on that rental vehicle, the metadata comprising an identifier for each rental vehicle depicted in the rental vehicle images and a temporal identifier indicative of when each rental vehicle image was created, (2) accessing data stored in a memory representative of a plurality of condition reports, the condition report data corresponding to a plurality of rental transactions for a plurality of rental vehicles, each condition report comprising data indicative of a condition for each rental transactions' rental vehicle, (3) processing the accessed condition report data and the received metadata, (4) determining which of the received rental vehicles and which of the accessed condition reports correspond to the same rental transactions based on the processed condition report data and the processed metadata, and (5) in response to a determination that a rental vehicle image corresponds to a condition report, creating an association in a memory between that rental vehicle image and that condition report, and wherein the receiving, accessing, processing, determining, and creating steps are performed by a processor. The inventors also disclose corresponding processors and computer program products that are configured to perform such methods. Through associations such as these in a computer memory, the disclosed embodiments effect dramatic improvements in the technical fields of tracking damage to rental vehicles over time and tracing such damage to particular rental transactions and/or points in time.

Still further, the inventors disclose a system comprising (1) a plurality of gate cameras at a plurality of rental sites, the gate cameras configured to generate a plurality of images of rental vehicles as the rental vehicles arrive at or depart from the rental sites, and (2) a computer system in communication with the gate cameras, wherein the computer system comprises a database in which is stored at least one member of the group consisting of (1) rental agreement data, the rental agreement data being representative of a plurality of rental agreements for a plurality of rental transactions with respect to a plurality of rental vehicles, and (2) condition report data, the condition report data corresponding to a plurality of condition reports and comprising data indicative of a condition for a plurality of rental vehicles with respect to a plurality of rental transactions, and wherein the computer system is configured to: (1) receive the rental vehicle images from the gate cameras, the gate camera rental vehicle images being associated with metadata, the metadata comprising an identifier for each rental vehicle depicted in the gate camera rental vehicle images and a temporal identifier indicative of when each gate camera rental vehicle image was created, (2) search the database based on the metadata for the gate camera rental vehicle images to automatically pair each of a plurality of the gate camera rental vehicle images with the at least one member that corresponds to a rental transaction in common between the subject gate camera rental vehicle image and the subject at least one member, (3) store the paired gate camera rental vehicle images in the database, and (4) create a plurality of associations in the database between the paired gate camera rental vehicle images and each at least one member paired thereto to thereby make the database a searchable multi-rental site database of gate camera rental vehicle images that have been associated with their corresponding at least one member.

As additional example embodiments of such a system, the computer system may comprise a server and a plurality of rental site computer systems.

Moreover, the computer system may further comprise a gate camera web service interface, the gate camera web service interface configured to (1) define a standardized format for the gate camera rental vehicle images and their corresponding metadata, (2) receive a plurality of the gate camera rental vehicle images and their corresponding metadata, (3) validate the received gate camera rental vehicle images and their corresponding metadata against the standardized format, and wherein the computer system is further configured to perform the database search operation, the rental vehicle images storage operation, and the associations creation operation based on the validated gate camera rental vehicle images and their corresponding metadata. The use of such a web service interface permits any of a number of different types of gate cameras to be used together while still populating a common database of rental vehicle images. Further still, the system may employ mobile cameras and a mobile services interface to also integrate rental vehicle images generated by mobile cameras into the common database.

These and other features and advantages of the present invention will be apparent to those having ordinary skill in the art upon review of the teachings in the following description and drawings.

BRIEF DESCRIPTION OF THE DRAWINGS

FIGS. 3(a)-(c) depict examples of data structures for a metadata database according to an exemplary embodiment.

FIG. 4 depicts an exemplary computer system according to an exemplary embodiment for associating rental vehicle images and metadata with corresponding rental agreements and condition reports.

FIGS. 5(a) and (b) depict an exemplary data structures for a condition report.

FIGS. 9(a)-(c) depict examples of user interfaces for searching a database to locate rental vehicle images that match user-defined search criteria.

FIGS. 10(a)-(c) depict examples of user interfaces for searching a database to locate rental vehicle images corresponding to condition reports for rental vehicles.

DETAILED DESCRIPTION

Figure 1:
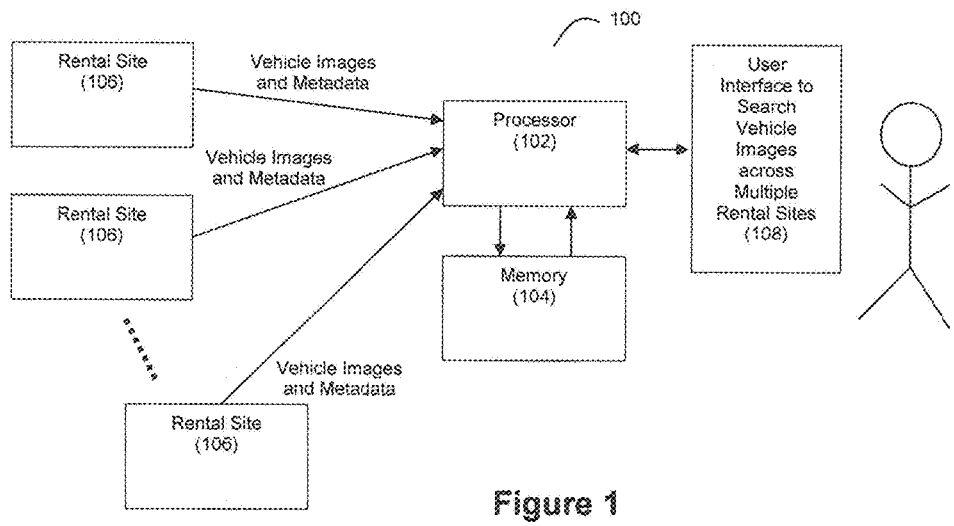
FIG. 1 depicts an example of a computer system according to an exemplary embodiment.

FIG. 1 depicts an exemplary computer system 100 for an embodiment whereby vehicle such as rental vehicle images and associated metadata are received from multiple sites such as rental sites and processed to create a database that can be searched to access vehicle images across a number of different vehicle sites. The system 100 may comprise a processor 102 and memory 104 that receive rental vehicle images and metadata from a plurality of different rental sites 106. The processor 102 and rental sites 106 may communicate with each other over a network such as the Internet or other suitable linkages for communicating data. The processor 102 and memory 104 can interact to execute computer-executable instructions to create the searchable database of vehicle images, and the system 100 may further comprise a user interface 108 through which a user can search the database. The computer-executable instructions can take the form of software resident on a non-transitory computer-readable storage medium such as memory 104.

Figure 2:
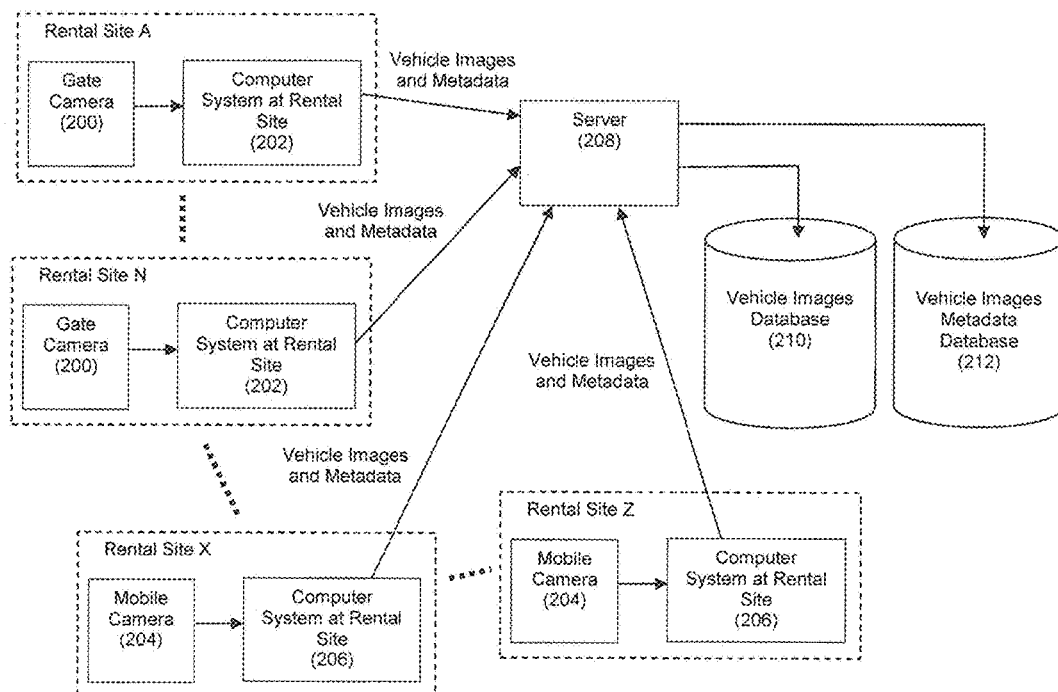
FIG. 2 depicts another example of a computer system according to an exemplary embodiment.

In the example of FIG. 2, the processor 102 and memory 104 can be implemented via a server 208 and databases 210 and 212. Moreover, different rental sites can employ different camera systems for capturing the rental vehicle images.

In the example of FIG. 2, a plurality of the rental sites include a gate camera 200. These gate cameras 200 can be positioned near the entrance/exit gates of the rental sites to capture images of the rental vehicles as they arrive at or depart from the rental sites. Any of a number of gate camera systems can be used in this regard, whether a single camera be used at a gate or multiple cameras be used at the gate. In a preferred embodiment, the gate camera system is configured to capture images of rental vehicles from multiple angles so as to capture at least the front, driver-side, passenger-side, and rear of the rental vehicle. Moreover, the gate camera system is preferably configured to capture such images so that they exhibit sufficient clarity and resolution to detect a desired level of damage such as body damage to the vehicle. For example, a practitioner may want the vehicle images to have sufficient clarity and resolution to pick up golf ball-sized dents on the vehicle. However, it should be understood that larger or smaller damage detection requirements could be implemented if desired. A computer system 202 at the rental site can be used to collect the rental vehicle images from the gate camera 200 and communicate the rental vehicles images and the metadata associated with such images to the server 208. The gate camera system is expected to be particularly useful for capturing rental vehicle images at rental sites with high volumes of traffic and controlled ingress/egress such as airport rental branch locations. However, the use of such gate camera systems need not be limited to airport rental branch locations.

Furthermore with the FIG. 2 example, a plurality of the rental sites can include a mobile camera 204 to capture rental vehicle images. At some rental sites, rental car company personnel may be equipped with mobile cameras 204 (such as cameras integrated into a tablet computer or smart phone, or even handheld standalone digital cameras) so that the rental car company personnel can capture images of a rental vehicle at the start of a rental transaction and at the end of a rental transaction. The mobile cameras 204 are preferably configured to capture rental vehicle images of a quality corresponding to that described above for the gate cameras (e.g., of sufficient clarity and resolution to detect a desired degree of body damage). A computer system 206 at the rental site can be used to collect the rental vehicle images from the mobile camera 204 and communicate the rental vehicles images and the metadata associated with such images to the server 208. The computer system 206 in such a scenario can include processing logic and an associated set of user interfaces for completing a rental agreement and condition report for a rental transaction when a customer arrives to pick up a rental vehicle. The set of user interfaces can include a capability for the user to take photographs of the rental vehicle and associate such a photographs with the rental transaction (and thus with the rental agreement for that rental transaction). As part of this process, the user can itemize and describe any damage items for the rental vehicle, where such itemized damage items can be included in a condition report to describe a starting rental vehicle condition for the rental transaction. Similarly, a set of user interfaces for ending a rental transaction by closing out a rental contract can be accessed through the computer system 206. Thus, when a customer returns to a rental site to drop off a rental vehicle at the conclusion of a rental transaction, the user can access user interface screens through the computer system 206 to close out the rental agreement and update the condition report for the rental transaction to reflect an ending rental vehicle condition for the transaction. As part of this, the user interfaces can be configured to permit the user to take photographs of the rental vehicle and associate them with the rental transaction (and thus with the rental agreement and condition report for that rental transaction). The computer system 206 for use with such mobile cameras 204 can take any of a number of forms, including tablet computers, smart phones, a server-based computer network, and the like.

Thus, server 208 is capable of receiving rental vehicle images and associated metadata from a number of different types of image acquisition systems (e.g., gate camera systems, mobile cameras, etc.) at a number of different rental sites where the images will document the body damage condition of the rental vehicles at the start and conclusion of each rental transaction with respect to such rental vehicles. The server 208 can process the received rental vehicle images and associated metadata to create a database 210 in which the rental vehicle images are stored and a database 212 in which the vehicle images metadata is stored. As such, databases 210 and 212 serve as the searchable data of multi-rental site rental vehicle images.

It should be understood that databases 210 and 212 can implemented in physically separate memory devices, although this need not be the case. Furthermore, one or more of the databases 210 and 212 can be stored in a cloud storage service if desired by a practitioner. Also, the databases can be configured using any known appropriate data organization techniques, such as relational databases with highly structured data records, as XML data structures, or otherwise.

It should also be understood that in a preferred embodiment, the rental vehicle images are still photographs taken by the gate cameras 200 or mobile cameras 204. However, in some situations, a practitioner may choose to use cameras to capture video of rental vehicles at the start or end of a rental transaction. In such embodiments, a practitioner may also choose to employ processing logic to extract photographs of the rental vehicles from the video footage using known image processing techniques, whereupon the extracted photographs are used as the rental vehicle images. However, this need not be the case, and the rental vehicle images themselves could be video images if desired by a practitioner.

FIGS. 3(a)-(c) illustrate examples of different data structures 300 that can be used for the vehicle image metadata. This metadata can be provided to server 208 in a separate file or message that accompanies the rental vehicle image files. The server 208 can then create data structures 300 from these files to be stored in database 212. In the example of FIG. 3(a), the data structure 300 comprises an image identifier 302 that serves to identify a rental vehicle image file in database 210. The data structure 300 can also include a temporal identifier configured to identify when a corresponding rental vehicle image was created. This temporal identifier can include a date/time stamp for the corresponding rental vehicle image as shown by columns 304 and 306 in FIG. 3(a). The gate cameras 200 and mobile cameras 204 at the rental sites (or their corresponding computer systems 202/206) can be readily configured to provide such date/time stamps in association with the rental vehicle images they create. The metadata data structure 300 can also include a location identifier 308 for the rental site where the rental vehicle image was created. Thus, the location identifier 308 can serve to identify a particular rental vehicle branch location where a rental vehicle image was captured. Once again, the computer systems 202 and 206 at the rental sites can readily be configured to include this information with the metadata sent to server 208. However, it should be understood that the server 208 can be configured to create the location identifier 308 if desired by a practitioner. That is, the server 208 can be configured to assign a particular location identifier 308 to rental vehicle images received from particular cameras.

Another item that can be included with the metadata in data structure 300 is a vehicle identifier 310. The vehicle identifier will serve to uniquely identify the rental vehicle that is depicted in the corresponding rental vehicle image. This vehicle identifier 300 can take any of a number of forms. For example, it can be a license plate state and number for a rental vehicle. As another example, it can be a vehicle identification number (VIN) for the rental vehicle. As yet another example, it can be a unique inventory number for the rental vehicle if such inventory number is different than the license plate state/number or VIN. Moreover, the vehicle identifier 310 can be captured in any of a number of ways. For example, the computer system 202/206 (or server 208) can be configured to extract a license plate state and number from the rental vehicle images through image processing techniques and optical character recognition technology as is known in the art. As another example, a bar code reader or the like can be employed at a rental site in a location to automatically detect a bar code or the like on the rental vehicle as the rental vehicle departs from or arrives at the rental site. This bar code can express the rental vehicle's VIN or unique inventory number. Still further, vehicle telematics can be used to communicate a vehicle identifier from the vehicle to server 208 when the vehicle arrives at or departs from a rental site. As yet another example, personnel at the rental site can manually key in a vehicle identifier 310 for a rental vehicle as images of such rental vehicle are captured.

It should be understood that the metadata data structure 300 of FIG. 3(*a*) is exemplary only, and more, fewer, and/or different items of metadata could be employed. For example, FIG. 3(*b*) depicts a metadata data structure 300 which also includes an arrival/departure flag 312 to identify whether the corresponding rental vehicle image is an image of the rental vehicle arriving at the rental site (e.g., at the end of a rental transaction) or an image of the rental vehicle departing from the rental site (e.g., at the start of a rental transaction). The value for this identifier 312 can be ascertained in any of a number of ways. For example, with respect to a rental site where different gate cameras are used to take photographs of arriving/departing rental vehicles, the arrival/departure flag can be set based on which gate camera captured the image. As another example, where a mobile camera 204 associated with a rental vehicle pickup application is used to capture the rental vehicle image, the computer system 206 can set the arrival/departure flag 312 to indicate a departure image. Similarly, where a mobile camera 204 associated with a rental vehicle check-in application is used to capture the rental vehicle image, the computer system 206 can set the arrival/departure flag 312 to indicate an arrival image. Thus, it should be understood that based on the arrival/departure flag, a damage assessment system can readily locate images of a rental vehicle at the start and end of each rental transaction to thereby permit an assessment of whether any body damage occurred while a rental vehicle was in the custody of a particular renter.

Still further, the metadata data structure 300 may also include a camera identifier for each rental vehicle image. The camera identifier can uniquely identify the camera that created the corresponding image. Thus, at a gate where a gate camera system uses separate cameras to capture front, driver-side, passenger-side, and rear views of the rental vehicle (e.g, Cameras 1-4 respectively), a camera ID metadata field can identify which camera generated the image. Thus, if a user wanted to search through a series of images for different rental vehicles but only from a front view, the user could use "Camera 1" as a retrieval condition for images through a search interface.

As another example, FIG. 3(*c*) depicts a metadata data structure 300 which also includes a rental agreement identifier 314 to identify the rental agreement associated with the corresponding rental vehicle image. This rental agreement identifier can be a unique identifier (such as a character string) that is assigned to a rental agreement to specifically identify a rental transaction, or it can be a pointer to a copy of the rental agreement in a rental agreement database. The term "rental agreement" is used herein in accordance with its conventional meaning in the rental car industry to mean a contract between a rental car company and a renter that defines the terms and conditions for a rental transaction. To be able to pick up a rental vehicle as part of a rental transaction and depart from a rental facility with the rental vehicle, a customer will have needed to complete a rental agreement with the rental car company. This rental agreement metadata can be ascertained in any of a number of ways. For example, in scenarios where a mobile camera 204 associated with a rental vehicle pickup application is used to capture the rental vehicle image, the computer system 206 can associate the rental agreement identifier corresponding to the pickup transaction with the rental vehicle image. Similarly, where a mobile camera 204 associated with a rental vehicle check-in application is used to capture the rental vehicle image, the computer system 206 can associate the rental agreement identifier corresponding to the check-in transaction with the rental vehicle image. In a gate camera situations, the computer system 202 can be configured to determine the vehicle identifier 310 as previously described and then use this vehicle identifier to find the rental agreement relating to the rental vehicle corresponding to the vehicle identifier, and then associate the found rental agreement with the captured rental vehicle image.

However, it should be understood that the rental agreement identifier 314 can also be associated with the rental vehicle image through the metadata data structure 300 on an as needed basis if desired (e.g., after a damage notification about a rental vehicle has been received—see FIG. 6(*a*) discussed below). FIG. 4 depicts an exemplary computer system for associating rental vehicle images and metadata with corresponding rental agreements and condition reports. The processor 102 can be configured to execute processing logic 400, where the processing logic 400 will interact with the vehicle images database 210, vehicle images metadata database 212, a rental agreement database 402, and/or a vehicle condition database 404 to associate rental vehicle images with appropriate rental agreements and condition reports.

A rental agreement database 402 can be configured to store rental agreement data for a plurality of rental transactions. Each rental agreement can be associated with a unique rental agreement identifier (e.g., rental agreement identifier 314), identifying information for the renter (e.g., name, address, etc.), a vehicle identifier for the rental vehicle, and other data pertaining to the rental transaction (e.g., a daily/weekly rate, start date, expected end date, etc.). This information can be populated into database 402 when a customer completes a rental agreement so that rental vehicle pickup can be commenced. Furthermore, this rental agreement data can be updated when a renter returns a rental vehicle to the rental car company at the conclusion of a rental transaction.

As part of the pickup and check-in process, personnel of the rental vehicle company can be tasked with creating condition reports for the rental vehicles at the start and end of each rental transaction. As such, these condition reports can also be associated with each rental agreement. Through the condition reports, rental car company personnel will document observed damage items on the rental vehicle (e.g., documenting dents, scratches, and the like). If desired, the condition report data can be included in the rental agreement database 402 as part of the rental agreement data, or it can be stored in a separate vehicle condition database 404 if desired by a practitioner. The condition reports can be represented by a condition report data structure 500 as shown by the example of FIG. 5.

Each condition report can be identified by a condition report identifier 502. Furthermore, each condition report can include vehicle identifier 504 for uniquely identifying the rental vehicle that is the subject of the condition report. Furthermore, the condition report can include a temporal identifier such as a date stamp 506 and time stamp 508 to identify when the subject condition report was created (and optionally another set of fields to identify a date/time for a most recent update). Furthermore, the condition report can include one or more damage item fields 510 to identify observed damage items to the subject rental vehicle. Preferably, this field is used to identify a particular part or location on the rental vehicle that is damaged. A damage description field 512 can be paired with each damage item 510 to further describe the nature of the damage to the item that is the subject of the damage item field 510. Thus, a damage description of "large scratch" might be associated with a damage item of "rear bumper" as shown by FIG. 5.

It should be understood that the condition report data structure 500 of FIG. 5 is exemplary only, and condition reports can include more, fewer, and/or different fields of data if desired by a practitioner. For example, the condition reports might also include a rental agreement identifier to identify the rental agreement for the rental transaction to which the condition report pertains. Further still, separate condition reports can be created to document vehicle condition at the start and end of each rental transaction. Moreover, as noted, the condition report data can optionally be stored in its own database 404 or as part of the rental agreement data in the rental agreement database 402. Further still, it should be understood that some condition reports may not have any association with a rental agreement. For example, some rental vehicles may become damaged while not in the possession of a renter (e.g., damaged by an employee while moving a rental vehicle at a rental site or between rental sites; damaged by weather events at a rental site, etc.).

The processing logic 400 of FIG. 4 can be configured to associate condition reports and/or rental agreements with the rental vehicle images captured by cameras 200 and 204. This association can be performed in any of a number of modes as reflected by FIGS. 6(a)-(d). A practitioner can choose to implement the association processing operations in a mode deemed most useful for its business operation. After condition reports and/or rental agreements have been associated with rental vehicle images through the databases, a user of the system is then able to efficiently track and document the rental transactions during which body damage arose on rental vehicles. This ability to effectively zero in on body damage with documented visual proof can facilitate the ability to properly apportion repair costs to the responsible parties.

Figure 6A:
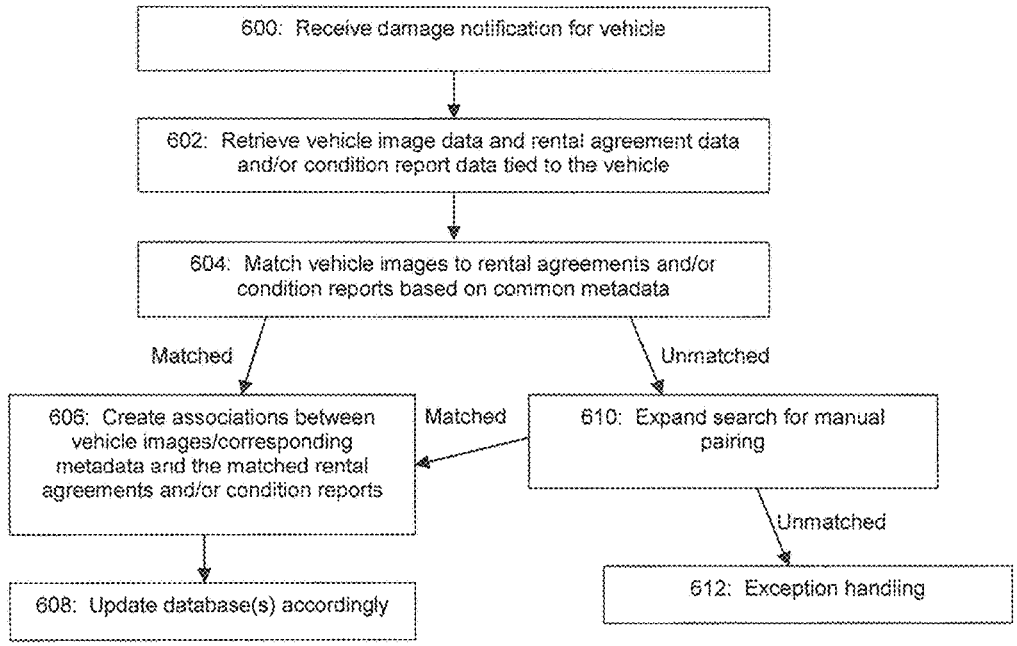
FIGS. 6(a)-(d) depict exemplary process flows for associating rental vehicle images with corresponding rental agreements and condition reports.

In the example of FIG. 6(a), the processing logic 400 is configured to associate rental vehicle images with condition reports and/or rental agreements in an on-demand mode (e.g., on an as-needed basis when damage claims are made with respect to rental vehicles). At step 600, the processor 102 receives a damage notification for a rental vehicle. This may occur when a rental car company employee detects reportable body damage to a rental vehicle and submits a loss damage report or repair request in a rental system or an inventory control system to have such damage fixed. Thus, the processing logic 400 can be configured to communicate with an inventory control system to receive new notifications of damage reports for rental vehicles. The damage notification received at step 600 can include a vehicle identifier that uniquely identifies the rental vehicle that is the subject of the damage claim.

Following step 600, step 602 is triggered. At step 602, the processor 102 retrieves rental vehicle image data and rental agreement data that are tied to the rental vehicle identified in the damage notification. This retrieval can be based on the vehicle identifier metadata in databases 212, 402, and 404 which matches the vehicle identifier in the received damage notification. A temporal constraint can also be used in this retrieval so that only rental vehicle images, rental agreements, and condition reports within some predetermined time window are retrieved at step 602 so as to not retrieve and process unnecessarily large volumes of data in step 602. Given that the goal of the process flow is to track when the damage occurred to the subject rental vehicle, it can be expected that the damage did not occur in the distant past. As such, a constraint such as using only the past 30 or 60 days of images, rental agreements, and condition reports could be imposed on the retrieval step 602 if desired.

Next, at step 604, the processor 102 performs a metadata-based matching operation to identify particular ones of the rental vehicle images that correspond to particular ones of the rental agreements and/or condition reports for which data was retrieved at step 602. For example, the temporal identifiers (date/time stamps) and vehicle identifiers in the metadata database 212 and in the rental agreement database 402 and/or condition database 404 can be used to determine which rental vehicle images go with which rental agreements and/or which condition reports. For example, the matching step 604 can be configured to search for (1) matches between the license plate number field (e.g., vehicle identifier field 310) of the image metadata from database 212 and the license plate number field (e.g., vehicle identifier field 504) of the condition report data in database 404, and (2) matches between the date/time fields 304/306 of the image metadata from database 212 and the date/time fields 506/508 of the condition report data in database 404. This matching operation can be fully automated. Furthermore it should be understood that the date/time matching can be configured to use approximate matching techniques wherein exact matches between the respective date/time fields need not be required. For example, a tolerance that defines a predetermined amount of time (e.g., X minutes) can be used to judge whether a match exists between the date/fields such that condition reports and vehicle images that were date/time stamped within the defined time tolerance can still be deemed matches. Furthermore, in some situations an additional data field can be used for the matching operation, such as location data 308.

For the rental vehicle images that were matched with rental agreements and condition reports, step 606 operates such that the processor 102 creates associations between such rental vehicle images and their corresponding rental agreements and/or condition reports. Then, at step 608, the one or more of the databases 212, 402, and 404 are updated accordingly. For example, a condition report identifier field can be added to the metadata for a matched rental vehicle image in the metadata data structure 300 to identify the matched condition report for that rental vehicle image. Similarly, a rental agreement identifier field can be added or populated in the metadata database 212 accordingly. As another example, an image identifier field corresponding to field 302 of the metadata data structure 300 can be added to the condition report data structure 500 for the matched condition report to thereby identify the rental vehicle images that have been matched to condition reports (see FIG. 5(b), wherein field 520 creates an association between a condition report and a vehicle image). It should be further understood that in situations where condition reports are used to document vehicle condition at the start and end of each rental transaction, the condition reports may be associated with a matched departure rental vehicle image to identify vehicle condition at the start of a rental transaction and with a matched arrival rental vehicle image to identify vehicle condition at the end of a rental transaction. Similarly, an image identifier field corresponding to field 302 of the metadata data structure 300 can be added to the rental agreement data for the matched rental agreement to thereby identify the rental vehicle images that have been matched to rental agreements. Once again, it should be further understood that in situations where it is desired that the rental agreement data document vehicle condition at the start and end of each rental transaction, the rental agreements may be associated with a matched departure rental vehicle image to identify vehicle condition at the start of a rental transaction and with a matched arrival rental vehicle image to identify vehicle condition at the end of a rental transaction.

For rental vehicle images that remain unmatched with rental agreements and/or condition reports following step 604, step 610 operates such that the processor 102 expands the search to include unmatched vehicle images for manual pairing. For example, if no matches were found based on the vehicle identifier and temporal identifier metadata fields, step 610 can search for all vehicle images at the subject location that are within a predetermined tolerance of the date/time of interest. A user can then review the vehicle images returned by this search to identify whether any of the vehicle images should be paired/matched with a condition report for the damage notification. For rental vehicle images that were matched in this fashion, the process flow can proceed to step 606. If a rental vehicle image remains unmatched following step 610, the process flow can proceed to an exception handling step 612, whereupon further efforts to find a match can be undertaken.

Figure 6B:
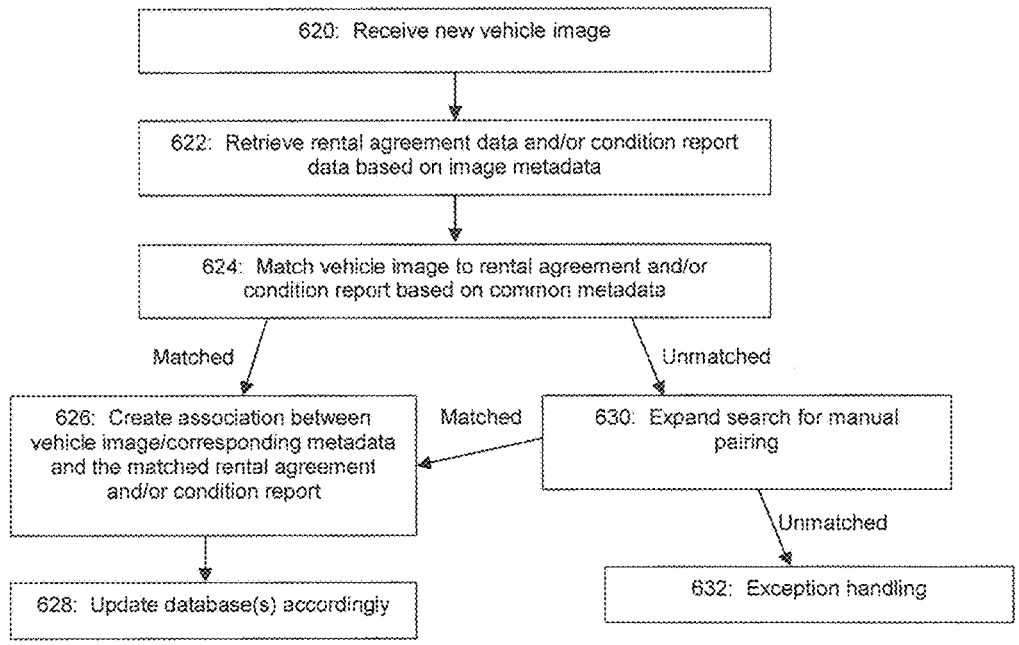

In the example of FIG. 6(b), the processing logic 400 is configured to operate in a continuous mode by associating rental vehicle images with condition reports and/or rental agreements each time a new rental vehicle image is received from a rental site at step 620. Steps 622-632 then proceed to operate as described above in connection with steps 602-612 respectively. Thus, in contrast to the operating mode of FIG. 6(a) (which associates vehicle images with condition reports and/or rental agreements on an as-needed basis as damage notifications are received), the operating mode of FIG. 6(b) seeks to pair all vehicle images with condition reports and/or rental agreements regardless of whether a damage notification has been received.

Figure 6C:
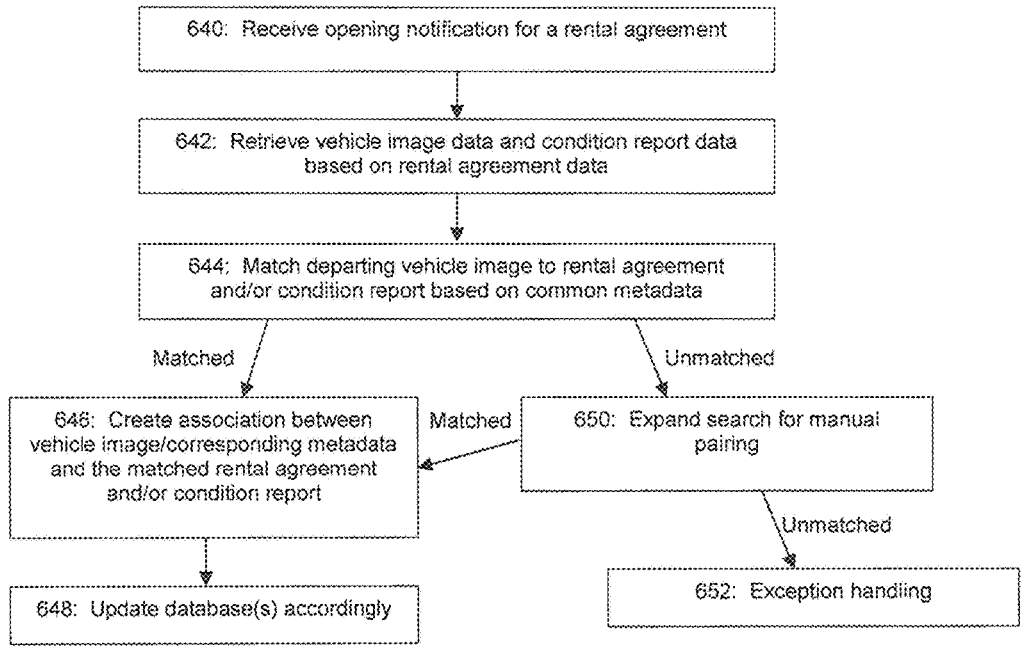

FIG. 6(c) depicts an example of another operating mode for the association process. With FIG. 6(c), the trigger that is used by the processing logic 400 to initiate the matching process is receipt of a notification that a rental agreement has been opened (step 640). This notification can be received whenever a new rental agreement with a status of "open" or the like is added to the rental agreement database 402. If the metadata for the rental vehicle images includes a rental agreement identifier, step 642 can then operate to retrieve relevant rental vehicle image(s) using the rental agreement identifier for the newly opened rental agreement. Given that the rental agreement was just opened, the retrieved rental vehicle images would be departure rental vehicle images. In another embodiment, the vehicle identifier for the newly opened rental agreement and any temporal data for the newly opened rental agreement can be used to find relevant metadata in the metadata database 212 for rental vehicle images for use during matching step 644. Thus, at step 644, if the vehicle identifier for a rental vehicle image matches the vehicle identifier for a newly opened rental agreement and if the date/time stamp for the rental vehicle image is a date/time around when the rental agreement was opened (e.g., a date/time stamp for the rental vehicle images that is on the same day as, and within X minutes of the rental agreement being opened), the rental vehicle image can be deemed a match to the newly opened rental agreement. Similar retrieval and matching can be employed with respect to condition report data. Thereafter, steps 646-652 generally correspond to steps 606-612 respectively.

Figure 6D:
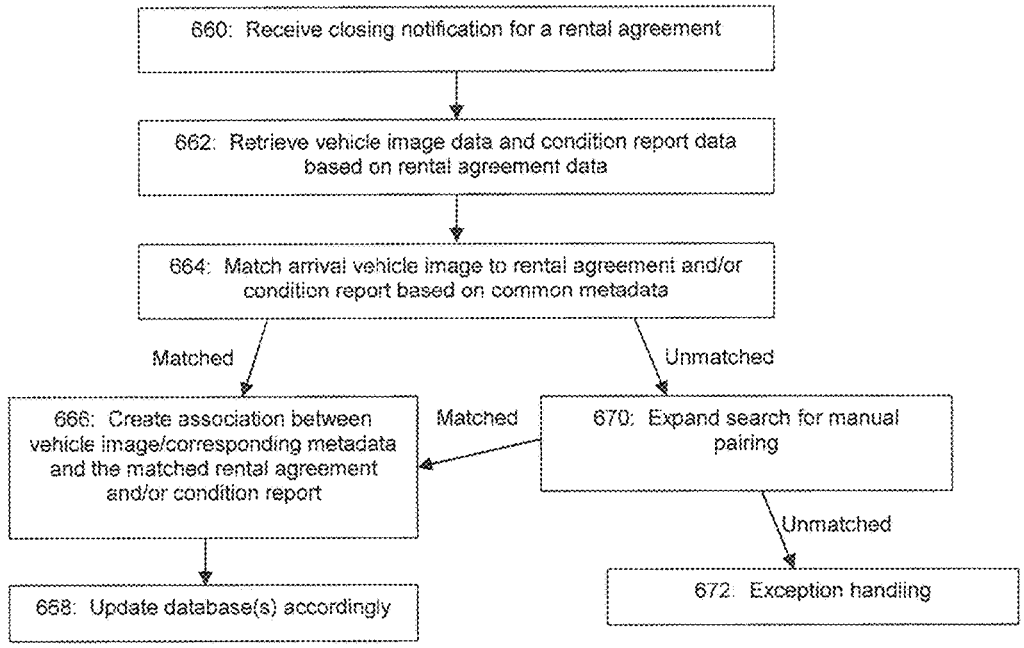

FIG. 6(d) depicts an example of yet another operating mode for the association process. With FIG. 6(d), the trigger that is used by the processing logic 400 to initiate the matching process is receipt of a notification that a rental agreement has been closed (step 660). This notification can be received whenever a rental agreement's status transitions to "closed" or the like in database 402. If the metadata for the rental vehicle images includes a rental agreement identifier, step 662 can then operate to retrieve relevant rental vehicle image(s) using the rental agreement identifier for the newly opened rental agreement. Given that the rental agreement was just opened, the retrieved rental vehicle images would include arrival rental vehicle images. However, the rental vehicle images may also include departure rental vehicle images depending on how the FIG. 6(d) process flow is implemented as discussed below. In another embodiment, the vehicle identifier for the newly closed rental agreement and any temporal data for the newly closed rental agreement can be used to find relevant metadata in the metadata database 212 for rental vehicle images for use during matching step 664. Thus, at step 664, if the vehicle identifier for a rental vehicle image matches the vehicle identifier for a newly closed rental agreement and if the date/time stamp for the rental vehicle image is a date/time around when the rental agreement was closed (e.g., a date/time stamp for the rental vehicle images that is on the same day as, and within X minutes of the rental agreement being closed), the rental vehicle image can be deemed a match to the newly closed rental agreement. Similar retrieval and matching can be employed with respect to condition report data. Thereafter, steps 666-672 generally correspond to steps 606-612 respectively.

It should be understood that the process flows of FIGS. 6(c) and (d) can be operated in tandem to capture both the departure and arrival rental vehicle images that are to be tied to each rental agreement and/or condition report. Alternatively, the process flow of FIG. 6(d) can be run without the process flow of FIG. 6(c), in which case the retrieval and matching steps 662 and 664 would be configured to retrieve and match both the departure and arrival rental vehicle images for a given rental agreement that has closed. This can be achieved by expanding the range of the temporal metadata for the rental vehicle images to include dates/times that are approximately within the open and close dates for the newly closed rental agreement.

Figure 7:
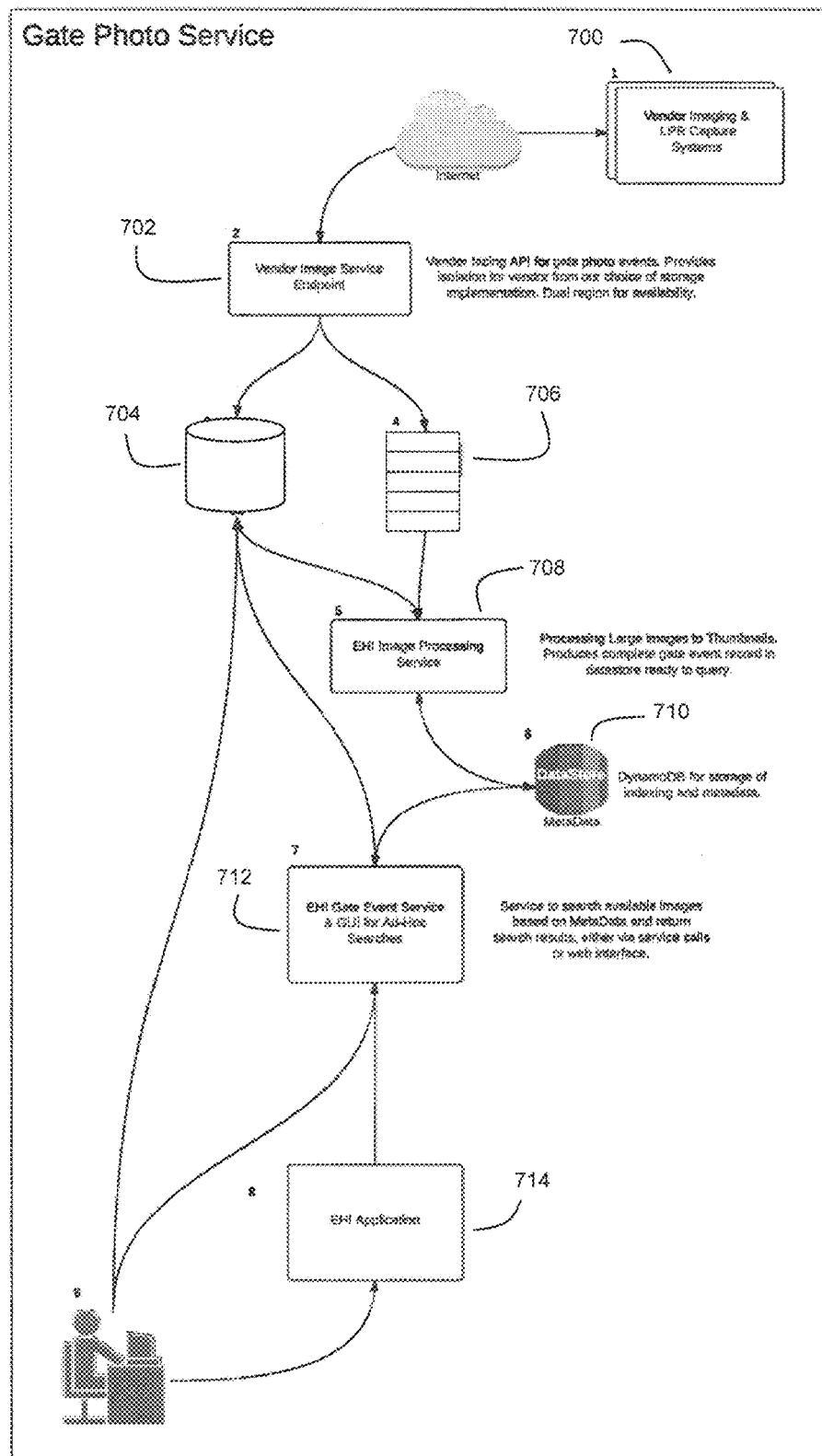
FIG. 7 depicts an exemplary process flow for a gate photo service in accordance with an exemplary embodiment.

FIG. 7 depicts an exemplary service flow for how gate photographs of rental vehicles can be processed and communicated to server 208. The gate camera system 700 can employ a gate camera 202 as discussed above. It is expected that one or more vendors would provide gate camera systems 700 for use at various rental sites. To integrate such different gate camera systems into the overall computer system, a web service interface 702 can be made available to the gate camera systems 700. This web service interface 702 can function as a vendor image service endpoint with an application programming interface (API) through which rental vehicle images and metadata are communicated to the server 208. The data standards and formatting requirements for the rental vehicle images and associated metadata can be communicated to the vendors (such as through a web services description language (WSDL) file) so that the vendors can configure the gate camera systems to issue appropriate web service calls to the interface 702. The web service interface would then include validation processing logic that analyzes incoming web service messages against the WSDL file to determine whether the messages comply with the standardized format requirements for the rental vehicle images and metadata. If validated, the rental vehicle images are stored in storage mechanism such as object storage 704 and a processing job corresponding thereto is added to queue 706. Storage mechanism 704 can serve as database 210. If not validated, the interface 702 can so notify the gate camera system 700 with a response message.

An image processing service 708 executed by server 208 can read the processing jobs queued in the simple queue service 706 to identify the images in storage 704 that are to be further processed. This processing operation by service 708 can include creating thumbnail images of the original rental vehicle images, creating lower resolution images of the original rental vehicle images, and/or performing image enhancement operations on the original rental vehicle images to improve clarity. As such, each original rental vehicle image from a gate camera system may be processed to also generate additional corresponding images of varying sizes and resolution. These new images can also be stored in storage 704. Furthermore, the service 708 can store the image metadata in a data store 710, which can serve as database 212.

A search service 712 can be configured to retrieve images and metadata from storage 704 and data store 710 in response to search requests. The service 712 can also be configured to provide graphical user interfaces (GUIs) pertaining to such services to one or more business applications 714 that have a need to access desired rental vehicle images. Service 712 can be configured to interact with business applications 714 via web service calls or direct web interfaces via the GUIs.

Figure 8:
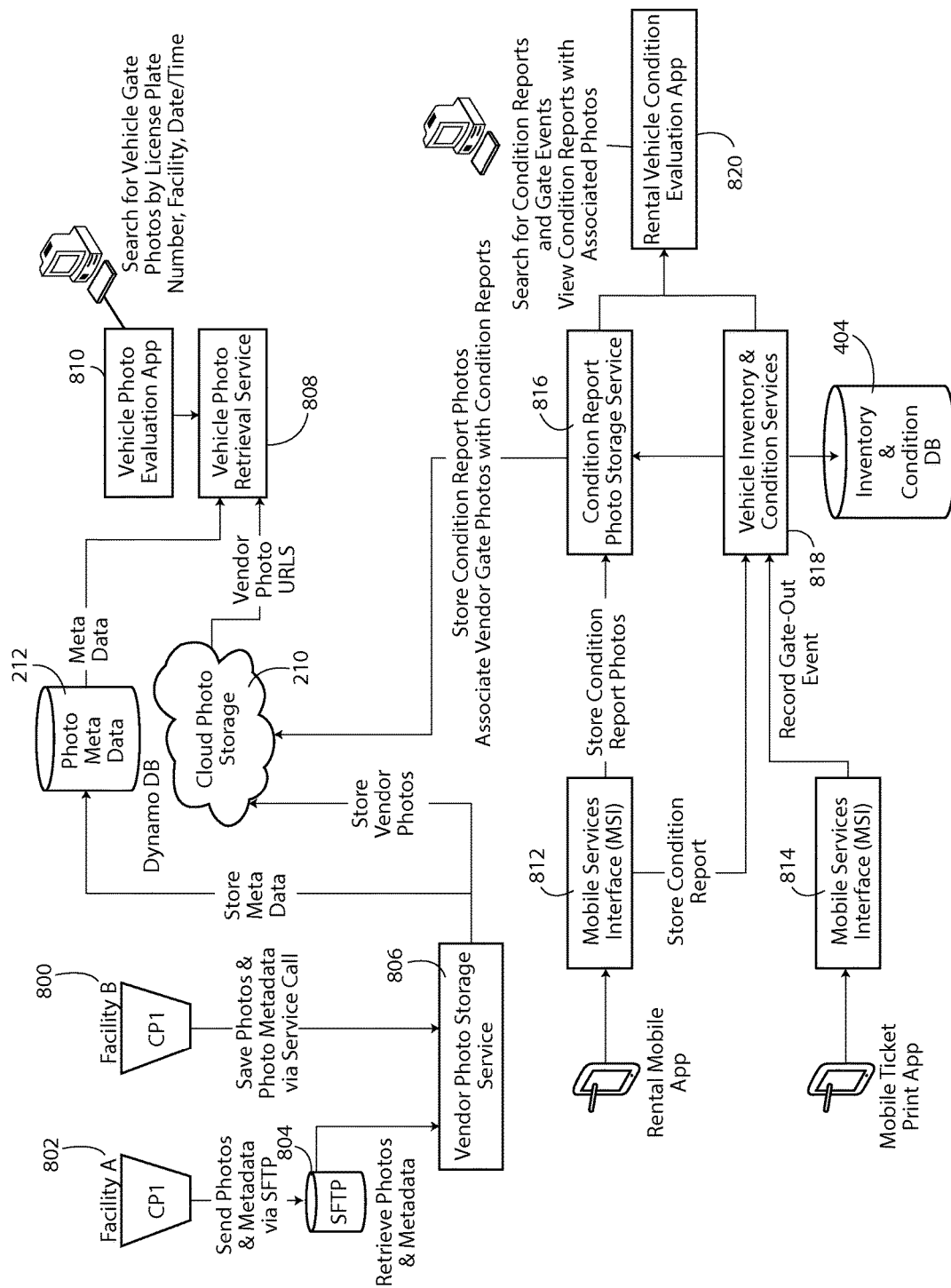
FIG. 8 depicts another example of a computer system according to an exemplary embodiment.

FIG. 8 depicts another exemplary embodiment for a computer system that is able to track damage to rental vehicles through the systematized collection of rental vehicle images. A first rental site (Facility A) is able to communicate gate rental vehicle images and associated metadata to a photo storage service 806 using techniques described in FIG. 7 with respect to components 700 and 702. However, other rental sites may be configured to communicate rental vehicle images and associated metadata to the server using different techniques. For example, a second rental site (Facility B) 802 can be configured to send the gate rental vehicle images and associated metadata to a file transfer protocol (FTP) database 804 using secure FTP (SFTP) techniques. The service 806 executed by server 208 can then also be configured to pull this data from the database 804 on a periodic or event-driven basis. Service 806 can also be configured to process the images as described for component 708 in FIG. 7 and store the images and metadata in databases 210 and 212. It can be seen that in the example of FIG. 8 database 210 is cloud storage. However, a practitioner can choose other storage locations if desired.

Another source of rental vehicles images from rental sites can be through execution of rental applications at rental sites such as mobile applications that are used to check a customer into a rental vehicle and/or mobile applications that are used to check a customer out of a rental vehicle. As previously described, rental car company personnel can be provided with tablet computers or the like to facilitate these processes. As part of a rental vehicle pickup process and a rental vehicle return process, a camera included within the tablet computer can be used to take photographs of a rental vehicle for use in a condition report that will document vehicle body condition at the time of pick up and at the time of return.

A mobile services interface (MSI) 812 executed by the server 208 can receive condition report data and rental vehicle image data from the tablet computers. The MSI 812 can communicate the condition report data to a vehicle inventory and condition service 818 executed by the server 208. Service 818 can be configured to update a vehicle condition database 404 with the condition report data. The MSI 812 can also communicate the rental vehicle images from the mobile applications to a condition report photo storage service 816. Service 816 can be configured to store these images in database 210. Given that the rental application can directly associate the condition report data with the vehicle images captured by the tablet computer, it should be understood that the association process flows of FIGS. 6(a)-(d) need not necessarily be applied to these non-gate vehicle images. Nevertheless, if an association between condition reports and vehicle images is not made at this time, it could be later performed using any of the techniques shown by FIGS. 6(a)-(d).

Another MSI 814 executed by the server 208 can receive gate-out events from a mobile application such as a mobile ticket print application. The mobile ticket print application can capture input from a user that flags when a renter has picked up a rental vehicle and departed from a rental facility with a rental vehicle (i.e., a gate out-event). Each gate-out event can include data that identifies the applicable date/time, the vehicle, the renter, the location, etc. The MSI 814 can interact with the vehicle inventory and condition services 818 to update database 404 with the gate-out information. Thus, the gate-out information can augment information in database 404 about the condition reports (and it could be similarly used to augment rental agreement data in a rental agreement database).

Figures 9A, 9B:
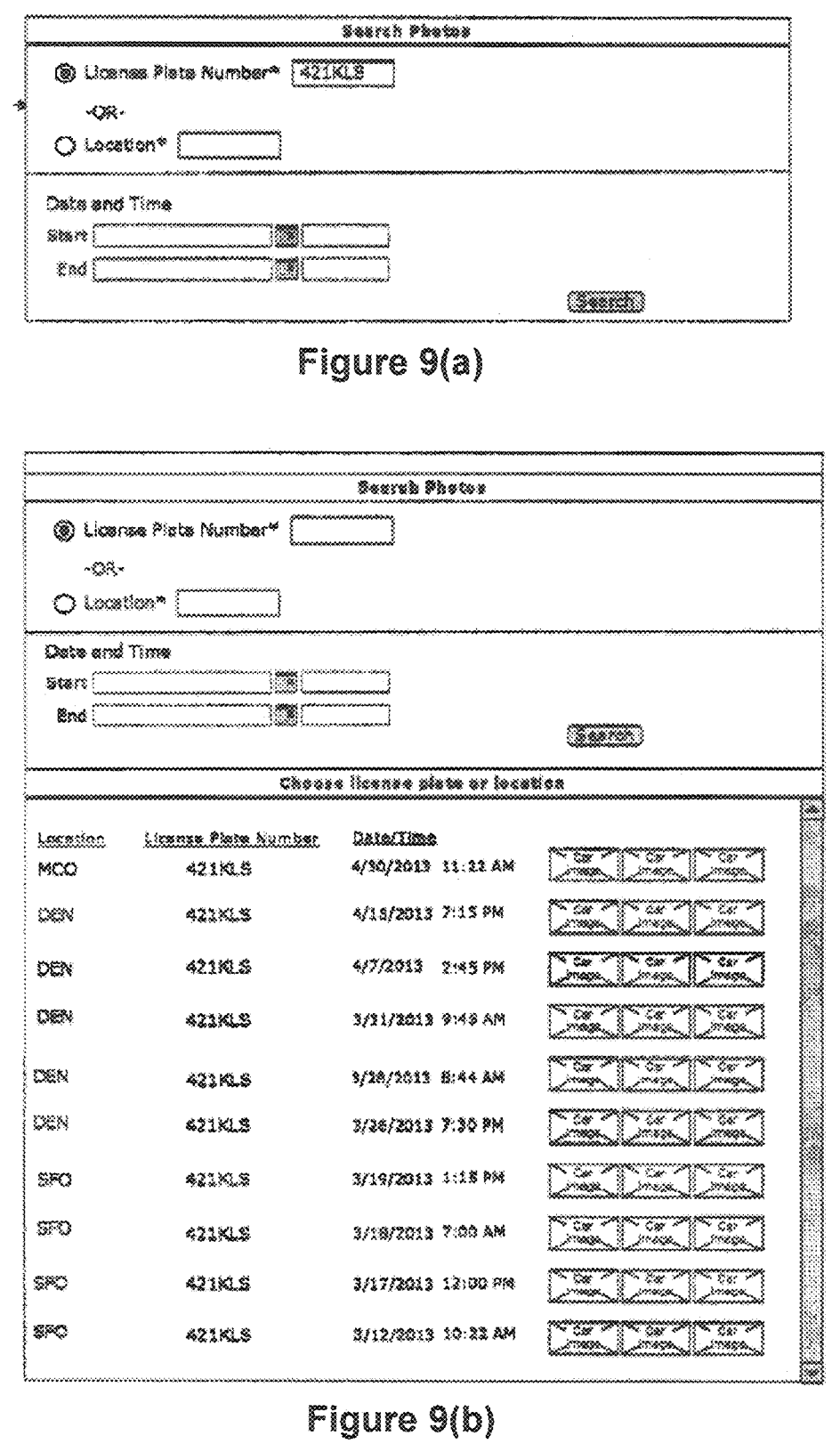
Figure 9C:
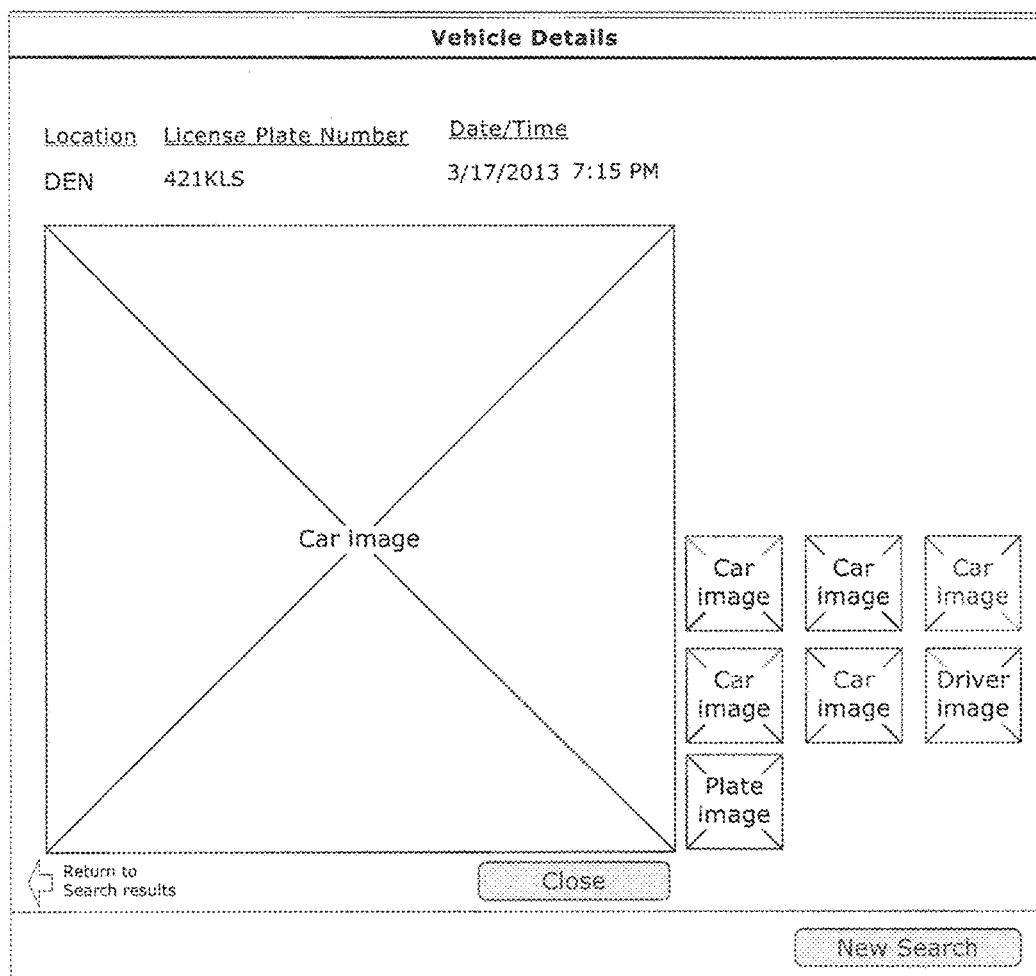

Various applications can be implemented that provide users with access to rental vehicle images within the database 210. For example, a vehicle photo evaluation application 810 can access the database 210 through a vendor photo retrieval service 808 executed by server 208. The service 808 can be configured to receive search queries from a user of the application 810. FIGS. 9(a)-(c) depict examples of graphical user interfaces (GUIs) for searching database 210 to locate rental vehicle images that match user-defined search criteria. It should be understood that access to such GUIs can be restricted to only those users who have appropriate authorization (such as users who provide an appropriate user ID and password on a preceding log-in screen).

Through the GUI of FIG. 9(a), the user can define the search criteria. In this example, the search fields are a vehicle identifier (e.g., a license plate number) or a location identifier (e.g., a rental vehicle branch location). The user is free to enter search values for either of those search criteria. The user can also input temporal search criteria such as start and end dates/times. It should be understood that these search fields are exemplary only and that any of the metadata fields of the metadata data structure 300 stored by metadata database 212 can be used as search criteria fields for the GUI. Upon selection of the search button, the search criteria are passed to service 808 to interact with database 212 to identify rental vehicle images whose metadata matches the defined search criteria.

FIG. 9(b) depicts an exemplary GUI that lists the rental vehicle images that were found as a result of the search. Each "hit" corresponds to a rental vehicle image in database 210 whose metadata matches the search criteria. The hits can be listed by location, license plate number, and their date/time stamp. Further still, thumbnails of the relevant rental vehicle images can be included in the listing. Each listed hit can be presented as a user-selectable link, which upon user selection navigates the user to a GUI such as that shown by FIG. 9(c) to provide the user with additional information about a listed rental vehicle image.

Thus, FIG. 9(c) is a details screen that provides a large view of the rental vehicle images corresponding to a particular vehicle at a particular date/time. One of the images can be presented in a large size, while the other corresponding images can be presented alongside the large image in thumbnail formats. The user can switch between which images are displayed in the large size by selecting one of the thumbnail images on the screen.

Figure 10B:
Figure 10C:
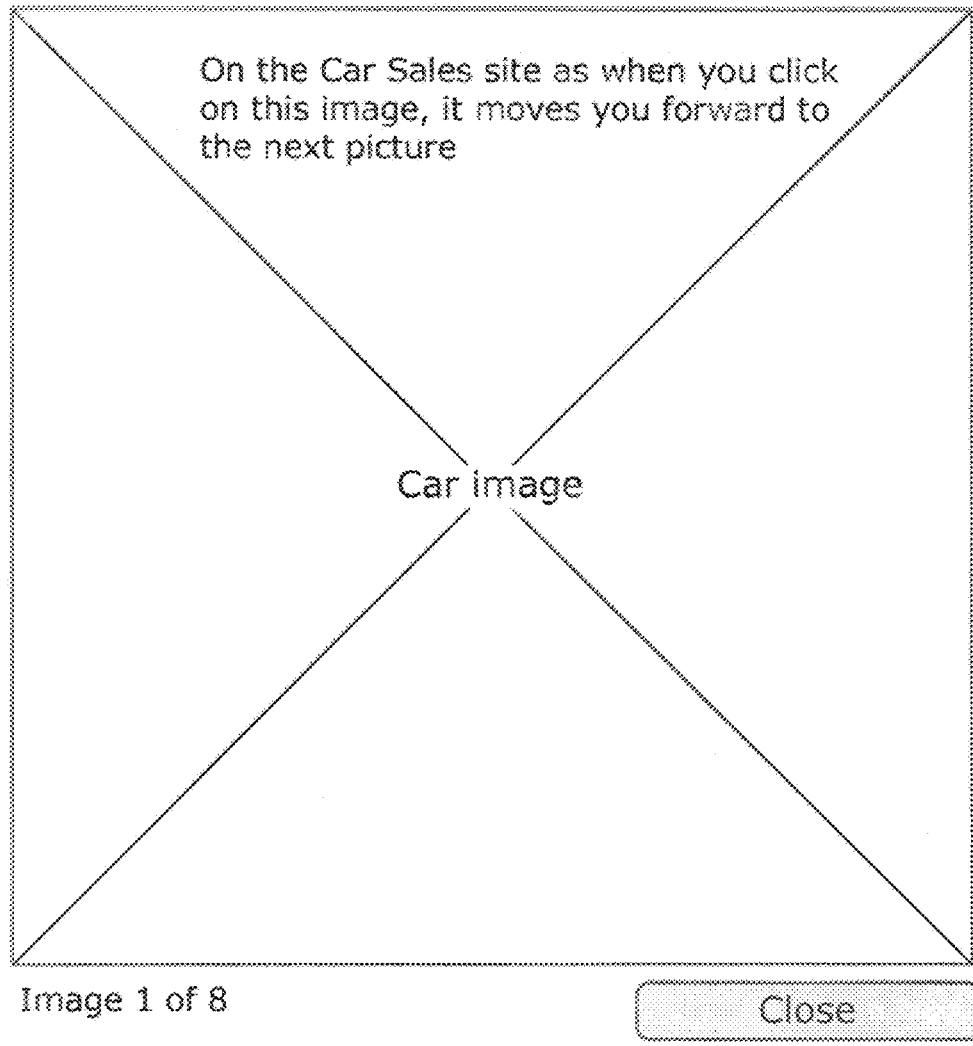

Another application that can access the databases 210 and 212 can be a rental vehicle condition evaluation application 820. A user can access application 810 when a damage report is made for a rental vehicle. Through application 820, the user can trigger performance of the association process flow of FIG. 6(a) and then locate rental vehicle images relevant to the damage report in order to assess when and under whose custody the damage occurred. To do so, application 820 can interact with services 816 and 818. FIGS. 10(a)-(c) depict examples of GUIs for a user to interface with application 820. Through the GUI of FIG. 10(a), a user can define search criteria for the rental vehicle that is the subject of the damage assessment. Examples of search criteria that can be used are branch locations (including optionally rental brands), start and end dates/times, and vehicle identifying information such as license plate number, unit number, VIN, or rental agreement number. The process flow of FIG. 6(a) can then use the vehicle identifying information to run the automated matching/association operations to tie the rental vehicle images for the subject rental vehicle to the corresponding condition reports for that rental vehicle.

A result of the search operation can then be presented in a bottom portion of the GUI, where each hit is listed by branch location, brand, license plate number, unit number, VIN, rental agreement number, and date. A "details" button or the like can be provided to permit a user to select any of the hits. Because of the association process executed through the process flow of FIG. 6(a), rental vehicle images for the hits are among the details that can be presented to the user. Thus, upon user selection of a details button, the GUI of FIG. 10(b) can be presented to the user. The rental vehicle images associated with the rental vehicle's condition report can be shown, with one of the image presented in a large size, and any other images presented as thumbnails. Once again, by selecting a thumbnail, the selected thumbnail can be subsequently displayed in the large size format. This allows a user to navigate among the rental vehicle images to assess when damage may have occurred to the rental vehicle, and in turn tie the damage to a particular rental agreement by finding a rental agreement where the starting condition for the rental vehicle did not include damage but the ending condition for the rental vehicle did include damage. Furthermore, a user can select the large size image to cause such image to be presented in an even larger size as shown by FIG. 10(c).

Another business application that can be configured to interact with databases 210, 212, and 404 is a car sales application. Many rental car companies will transition rental vehicles out of their rental fleets for sale as used cars to customers. A business application can be configured to process the condition report data in database 404 and the vehicle images in database 210 associated with the condition reports for that vehicle to generate a consolidated vehicle history that visually documents the damage history for the vehicle during its time as a rental vehicle. A consolidated vehicle history report can then be provided to customers who are interested in purchasing a former rental vehicle in order to inform the customer about the vehicle's history.

Furthermore, in an exemplary embodiment, it should be understood that rental vehicle images can be stored in database 210 for configurable time periods. As an example, for a system that employs the on-demand mode of associating rental vehicle images with condition reports, database 210 can be configure to retain unassociated rental vehicle images for less time than rental vehicle images which have been associated with condition reports. The rationale for this would be that after a defined amount of time, there is likely no need to retain the old unassociated rental vehicle image if no damage claim has been reported after this defined amount of time. However, a practitioner may want to retain the rental vehicle images tied to a damage claim for a longer period of time. Thus, the system can be configured to retain unassociated rental vehicle images for a period such as 90 or 120 days, while retaining rental vehicle images associated with condition reports for longer periods such as 2 years or longer. This may involve the use of separate databases for unassociated rental vehicle images and associated rental vehicle images, but this need not be the case.

While the present invention has been described above in relation to exemplary embodiments, various modifications may be made thereto that still fall within the invention's scope, as would be recognized by those of ordinary skill in the art. Such modifications to the invention will be recognizable upon review of the teachings herein.

What is claimed is:

1. A system for integrating images of rental vehicles from gate cameras and mobile devices to create a searchable database of rental vehicle images that integrates images of rental vehicles from multiple rental sites, the system comprising:
   a plurality of gate cameras at a plurality of rental sites, the gate cameras configured to generate a plurality of images of rental vehicles as the rental vehicles arrive at or depart from the rental sites, wherein the gate camera images show damage conditions of the rental vehicles depicted therein; and a plurality of mobile devices at a plurality of rental sites, the mobile devices comprising at least one of tablet computers and/or smart phones, each mobile device comprising (1) a mobile application configured to open or close a plurality of rental transactions for customers in response to user input, and (2) a mobile camera configured to generate a plurality of mobile camera images of a plurality of rental vehicles in relation to the rental transactions in coordination with the mobile application, wherein the mobile camera images show damage conditions of the rental vehicles depicted therein;

wherein the mobile application is further configured to (1) generate condition report data for the rental transactions in response to user input, and (2) create metadata for the mobile camera rental vehicle images, wherein the metadata for the mobile camera rental vehicle images comprises (i) an identifier for each rental vehicle depicted in the mobile camera rental vehicle images, and (ii) an association with the generated condition report data for each rental transaction relating to the subject mobile camera rental vehicle image;

a computer system in communication with the gate cameras and the mobile devices, wherein the computer system comprises:

a database configured to store (1) rental agreement data, the rental agreement data being representative of a plurality of rental agreements for a plurality of rental transactions with respect to a plurality of rental vehicles, and (2) condition report data, the condition report data corresponding to a plurality of condition reports from the mobile devices and comprising data indicative of a condition for a plurality of rental vehicles with respect to a plurality of rental transactions; and wherein the computer system is configured to:

receive the rental vehicle images from the gate cameras, the gate camera rental vehicle images being associated with metadata, the metadata comprising an identifier for each rental vehicle depicted in the gate camera rental vehicle images and a temporal identifier indicative of when each gate camera rental vehicle image was created;

receive the mobile camera rental vehicle images and their corresponding metadata from the mobile devices;

search the database based on the metadata for the gate camera rental vehicle images and the metadata for the mobile camera rental vehicle images to automatically pair each of a plurality of the gate camera rental vehicle images and each of a plurality of the mobile camera rental vehicle images with at least one of a rental transaction in the database and/or condition report data in the database in common between the subject gate camera rental vehicle image or subject mobile camera rental vehicle image;

store the paired gate camera rental vehicle images and the paired mobile camera rental vehicle images in the database in association with their corresponding rental transactions and condition report data; and create a plurality of associations in the database between the paired gate camera rental vehicle images, the paired mobile camera rental vehicle images, and their corresponding rental transactions and condition report data to thereby make the database a searchable multi-rental site database of gate camera rental vehicle images and mobile camera rental vehicle images that have been associated with rental transactions and condition report data.

2. The system of claim 1 wherein the computer system further comprises:

a server;

a plurality of rental site computer systems in communication with the server over a network, wherein each rental site computer system is also in communication with a gate camera and is configured to (1) receive a plurality of gate camera rental vehicle images from the gate camera with which it is in communication, and (2) communicate to the server a plurality of the gate camera rental vehicle images it receives and the metadata for those gate camera rental vehicle images; and wherein the server is configured to (1) receive the gate camera rental vehicle images and their corresponding metadata from the rental site computer systems, and (2) perform the database search operation, the rental vehicle images storage operation, and the associations creation operation based on the gate camera rental vehicle images and their corresponding metadata received from the rental site computer systems.

3. The system of claim 1 wherein the computer system further comprises:

a gate camera web service interface, the gate camera web service interface configured to (1) define a standardized format for the gate camera rental vehicle images and their corresponding metadata, (2) receive a plurality of the gate camera rental vehicle images and their corresponding metadata, (3) validate the received gate camera rental vehicle images and their corresponding metadata against the standardized format; and wherein the computer system is further configured to perform the database search operation, the rental vehicle images storage operation, and the associations creation operation based on the validated gate camera rental vehicle images and their corresponding metadata.

4. The system of claim 3 wherein the computer system further comprises:

a service program; and a mobile services interface, the mobile services interface configured to interface the mobile devices with the service program to communicate (1) a plurality of the mobile camera rental vehicle images and their corresponding metadata and (2) the generated condition report data to the service program;

wherein the service program is configured to (1) process the communicated condition report data, (2) update the database based on the processed condition report data, and (3) store the communicated mobile camera rental vehicle images and their corresponding metadata in the database in association with their corresponding condition report data.

5. The system of claim 1 further comprising:

a plurality of readers at a plurality of the rental sites, each reader configured to automatically detect a machine-readable code on each of a plurality of rental vehicles as those rental vehicles arrive at or depart from the rental sites where the readers are located; and wherein the computer system is in communication with the readers and further configured to generate the vehicle identifier metadata for a plurality of the gate camera rental vehicle images based on the detected machine-readable codes.

6. The system of claim 1 wherein the computer system is further configured to (1) perform image processing on a plurality of the gate camera rental vehicle images, (2) extract license plate information for a plurality of rental vehicles based on the image processing, and (3) generate the vehicle identifier metadata for a plurality of the gate camera rental vehicle images based on the extracted license plate information.

7. The system of claim 1 further comprising:
   a plurality of the rental vehicles that are equipped with vehicle telematics, the vehicle telematics configured to communicate a plurality of vehicle identifiers for those rental vehicles; and
   wherein the computer system is further configured to (1) receive the vehicle identifiers from the rental vehicles equipped with the vehicle telematics as those rental vehicles arrive at or depart from the rental sites, and (2) generate the vehicle identifier metadata for a plurality of the gate camera rental vehicle images based on the vehicle identifiers received via the vehicle telematics.

8. A method of integrating images of rental vehicles from gate cameras and mobile devices to create a searchable database of rental vehicle images that integrates images of rental vehicles from multiple rental sites, the method comprising:
   receiving a plurality of rental vehicle images from a plurality of gate cameras at a plurality of rental sites, wherein the gate camera rental vehicle images show damage conditions of the rental vehicles depicted therein;
   receiving metadata associated with the received gate camera rental vehicle images, the metadata for the gate camera rental vehicle images including identifiers for the rental vehicles depicted in the gate camera rental vehicle images;
   receiving a plurality of rental vehicle images from a plurality of mobile devices at a plurality of rental sites, the mobile devices comprising at least one of tablet computers and/or smart phones, wherein the mobile device rental vehicle images show damage conditions of the rental vehicles depicted therein;
   receiving metadata associated with the received mobile device rental vehicle images, the metadata for the mobile device rental vehicle images including identifiers for the rental vehicles depicted in the mobile device rental vehicle images;
   for at least a plurality of the received gate camera rental vehicle images and a plurality of the received mobile device rental vehicle images, (1) processing their associated metadata, (2) automatically creating a data association in a memory between at least a plurality of those gate camera rental vehicle images and mobile device rental vehicle images and their associated metadata with at least one of a condition report and/or a rental agreement for the rental vehicles depicted by those gate camera rental vehicle images and mobile device rental vehicle images; and
   creating a searchable multi-rental site database of gate camera rental vehicle images and mobile device rental vehicle images cross-indexed by rental vehicle identifiers, rental agreements, and condition reports; and
   wherein the method steps are performed by a processor.

9. The method of claim 8, wherein the rental vehicle images depict a plurality of rental vehicles with respect to at least one member of the group consisting of (1) at a start of a rental transaction, (2) at an end of a rental transaction, (3) arriving at a rental site, and (4) departing from a rental site.

* * * * *